United States Patent [19]

Ozawa et al.

[11] Patent Number: 4,884,129

[45] Date of Patent: Nov. 28, 1989

[54] SIGNAL PROCESSING APPARATUS FOR USE WITH A SINGLE CHIP SOLID-STATE COLOR CAMERA

[75] Inventors: Naoki Ozawa, Akishima; Toshiyuki Akiyama, Tokorozawa; Kenji Takahashi, Kanagawa; Itaru Mimura, Hachioji; Takahiro Nakano, Katsuta, all of Japan

[73] Assignee: Hitachi, Ltd., Tokyo, Japan

[21] Appl. No.: 171,714

[22] Filed: Mar. 22, 1988

[30] Foreign Application Priority Data

Mar. 23, 1987 [JP] Japan .................................. 62-65698

[51] Int. Cl.[4] ........................ H04N 9/077; H04N 9/04; H04N 9/64
[52] U.S. Cl. ........................................ 358/44; 358/36; 358/41
[58] Field of Search ...................... 358/41, 43, 44, 48, 358/36, 167, 213.15, 213.31

[56] References Cited

U.S. PATENT DOCUMENTS

| 4,620,222 | 10/1986 | Baba et al. | 358/44 |
| 4,656,503 | 4/1987 | Hynecek | 358/44 |
| 4,682,211 | 7/1987 | Kaji | 358/41 |
| 4,794,448 | 12/1988 | Takizawa | 358/44 |
| 4,809,074 | 2/1989 | Imaide et al. | 358/213.15 |

FOREIGN PATENT DOCUMENTS

| 56-116374 | 9/1981 | Japan . | |
| 57-208782 | 12/1982 | Japan | 358/44 |
| 60-3290 | 1/1985 | Japan . | |
| 60-10500 | 1/1985 | Japan . | |
| 60-253391 | 12/1985 | Japan | 358/41 |

OTHER PUBLICATIONS

Masamori Omae et al., "Color Imaging Characteristics of CCD for PAL System", *Preliminary Transactions of the 1985 Nationwide Congress of the Institute of Television Engineers of Japan*, 1985, pp. 83–84.

Primary Examiner—James J. Groody
Assistant Examiner—Randall S. Svihla
Attorney, Agent, or Firm—Pennie & Edmonds

[57] ABSTRACT

A signal processing apparatus for use with an imaging device having an image signal output circuit inherently generating noise in operation so that noise may be superposed on the image signal. The apparatus comprises a noise suppressor having a sampling and holding circuit for producing noise-suppressed pixel signals carrying different color information to contribute to suppression of noise superposed on the image signal and at the same time to demodulation of chroma signals representative of color components of an image and adders for producing a sum of and a difference between the noise-suppressed pixel signals to thereby produce a luminance signal and chroma signals for an image. The apparatus may further comprise a gain control circuits interposed between the sampling and holding circuit and the difference producing adder so that the amplitudes of the noise-suppressed pixel signals are leveled to improve the color purity of an image reproduced from the image signal.

11 Claims, 10 Drawing Sheets

| W  | Ye | W  | Ye |
|----|----|----|----|
| W  | Ye | W  | Ye |
| Cy | W  | Cy | W  |
| Cy | W  | Cy | W  |

FIG. 12

| Mg | G  | Mg | G  |
|----|----|----|----|
| Cy | Ye | Cy | Ye |
| Mg | G  | Mg | G  |
| Ye | Cy | Ye | Cy |

SIGNAL PROCESSING APPARATUS FOR USE WITH A SINGLE CHIP SOLID-STATE COLOR CAMERA

BACKGROUND OF THE INVENTION

The present invention relates to a signal processing apparatus for use with a single chip solid-state color camera, and more particularly, to a signal processing apparatus which allows achievement of both noise reduction and chroma signal demodulation.

Single chip solid-state color cameras using a solid-state imaging device such as a two-dimensional charge transfer device (CTD) (e.g., a charge coupled device (CCD), a charge sweep device (CSD) and the like) have been used majorly in home video cameras because of high reliability, productivity and so on.

A CCD solid-state imaging device comprises a plurality of photoelectric conversion elements arranged, for example, in rows and columns, a color filter including plural sorts of color filter elements which are mutually different in their transmission lights and are disposed to respectively cyclically correspond to the plurality of photoelectric conversion elements, a charge transfer means for transferring pixel signal pieces of the plurality of photoelectric conversion elements in the row direction, and an output means for extracting the pixel signal pieces of the photoelectric conversion elements transferred by the charge transfer means sequentially with a fixed period or at constant intervals.

An example of techniques for the purpose of reducing noise in the output of the single chip solid state-color camera employing the aforementioned CCD solid-state imaging device has been disclosed in, for example, NO. JP-A-60-10500 (laid open on Jan. 1, 1985) wherein the intended purpose is realized by the use of a circuit having such an arrangement as shown in FIG. 1.

Figure 1:
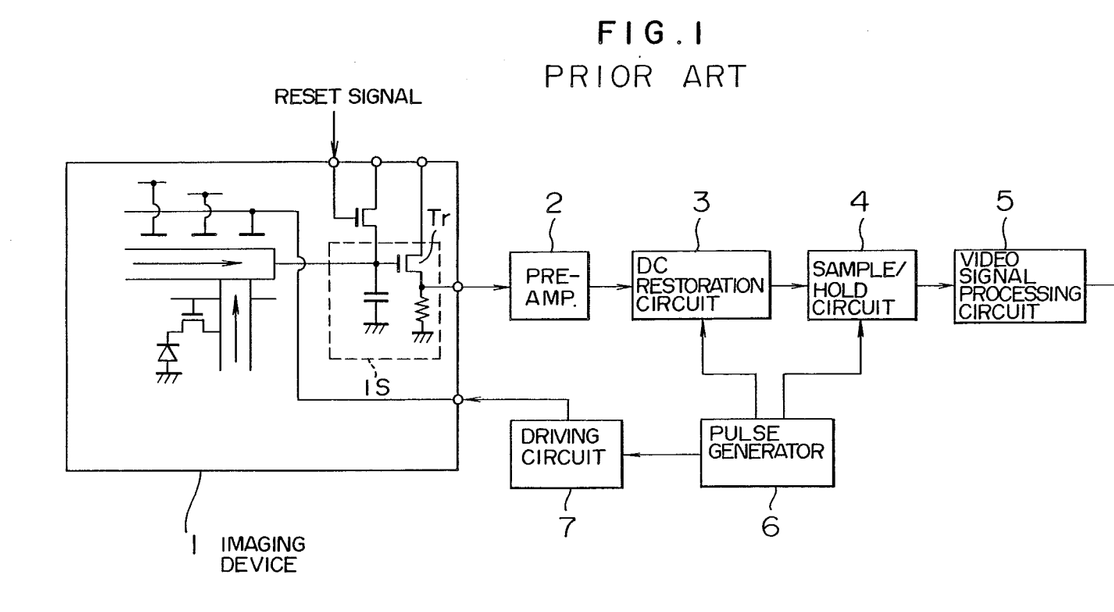
FIG. 1 shows an exemplary arrangement of a prior art signal processing circuit for use with an imaging device based on a conventional noise suppression method.

In FIG. 1, an output signal of a CCD imaging device 1 is supplied to a video signal processing circuit 5 through a preamplifier 2, a DC restoration circuit 3 and a sample-hold circuit 4.

A driving pulse signal generated by a pulse generator 6 is first supplied to a driving circuit 7 to be shaped therein and then is applied to the CCD imaging device 1.

Figure 2:
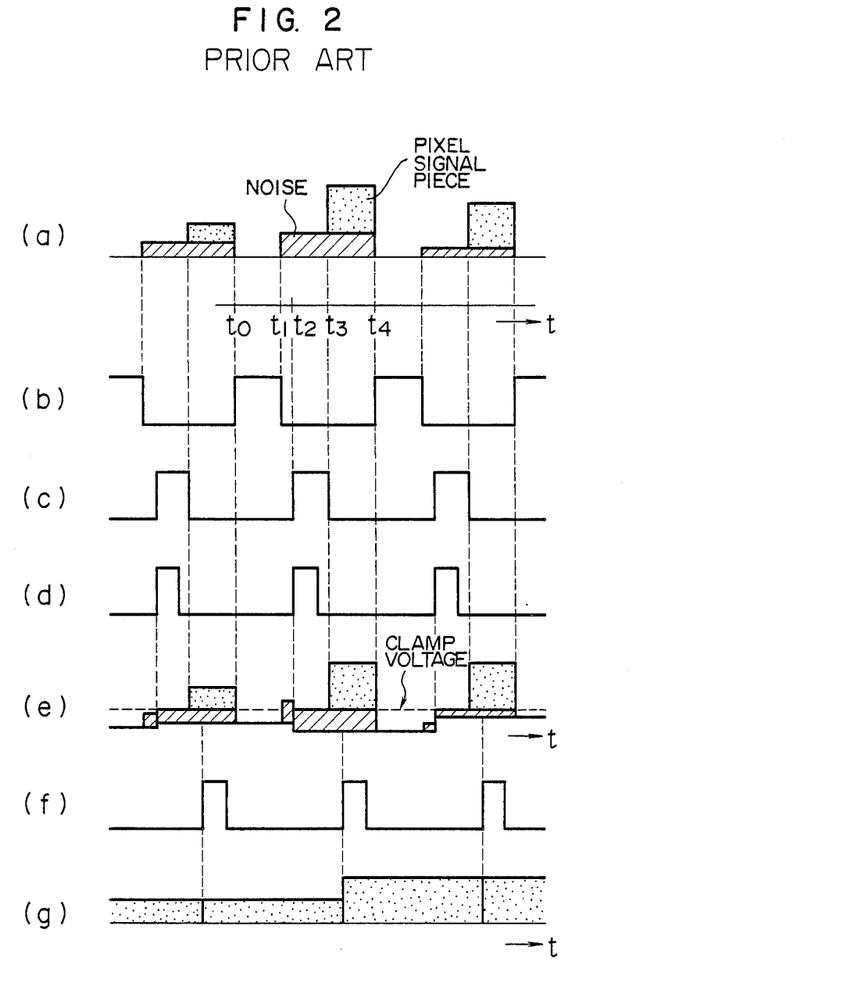
FIG. 2 shows waveforms of signals appearing in various points in FIG. 1 for explanation of the operation of the noise suppression method of FIG. 1.

As a result, the output signal of the imaging device 1 has such a waveform as shown in FIG. 2(a).

In this connection, a reset pulse signal applied to the imaging device 1 may have such a waveform as shown in FIG. 2(b), while the driving pulse signal applied to a driving electrode located nearest to a signal detector part 1S, which forms output means of the imaging device, has such a waveform as shown in FIG. 2(c).

In the signal waveform shown in FIG. 2(a), a duration from time $t_0$ to time $t_1$ is a reset duration during which a reset pulse signal (b) is used to clear the pixel charges accumulated in the signal detector part 1S. During this charge clearing operation, noise generated by a switching transistor Tr cyclically on-off controlled to send a pixel signal remains in the signal detector part 1S as reset noise and lasts to the starting end of the next reset duration. The photodiode charges or pixel charges are carried to the signal detector part 1S by a driving pulse signal (c) applied during a time between time $t_2$ and time $t_3$.

Consequently, in a duration from time $t_3$ to time $t_4$ from the falling edge of the reset pulse signal (c) to the beginning of the next driving operation, an image signal including pixel signal pieces superposed with reset noise is generated from the imaging device.

As will be appreciated from the foregoing explanation, in the pixel signal waveform of FIG. 2(a), only the reset noise appears in a duration from time $t_1$ to time $t_3$ while the pixel signal piece superposed with the reset noise appears in a duration from time $t_3$ to time $t_4$. Therefore, when such a timing pulse signal as shown in FIG. 2(d) is applied from a pulse generator 6 to the DC restoration circuit 3 in FIG. 1 so that the DC level of an output signal of the circuit 3 is clamped to a constant level during a time interval from the rising edge of the timing pulse (d) to the beginning of the reset period of the reset pulse signal (b) within the $t_1$–$t_4$ duration, there can be obtained from the circuit 3 a noise disabling output signal which has such a waveform as shown in FIG. 2(e).

When the noise disabling signal is applied to the sample-hold circuit 4 to sample it within the $t_3$–$t_4$ time duration by the use of such a timing pulse signal sent from the pulse generator 6 as shown in FIG. 2(f), the circuit 4 can produce such a pixel signal with the reset noise removed as shown in FIG. 2(g).

Figure 3:
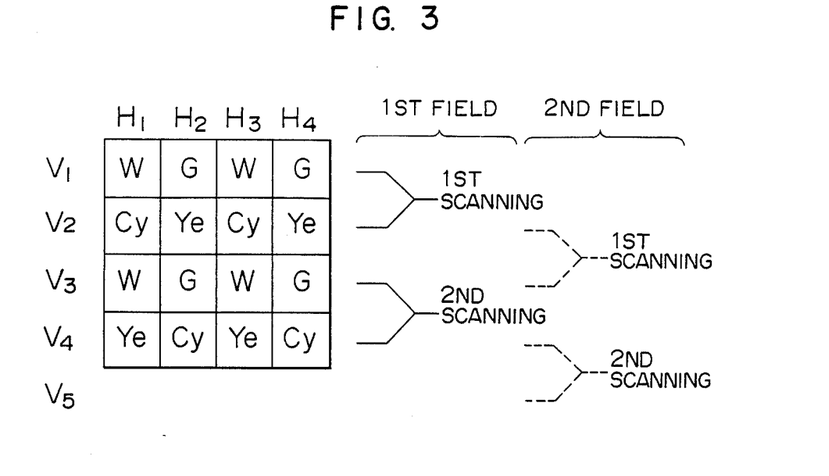
FIG. 3 shows an example of color filter used in a single chip solid-state color camera.
Figure 4:
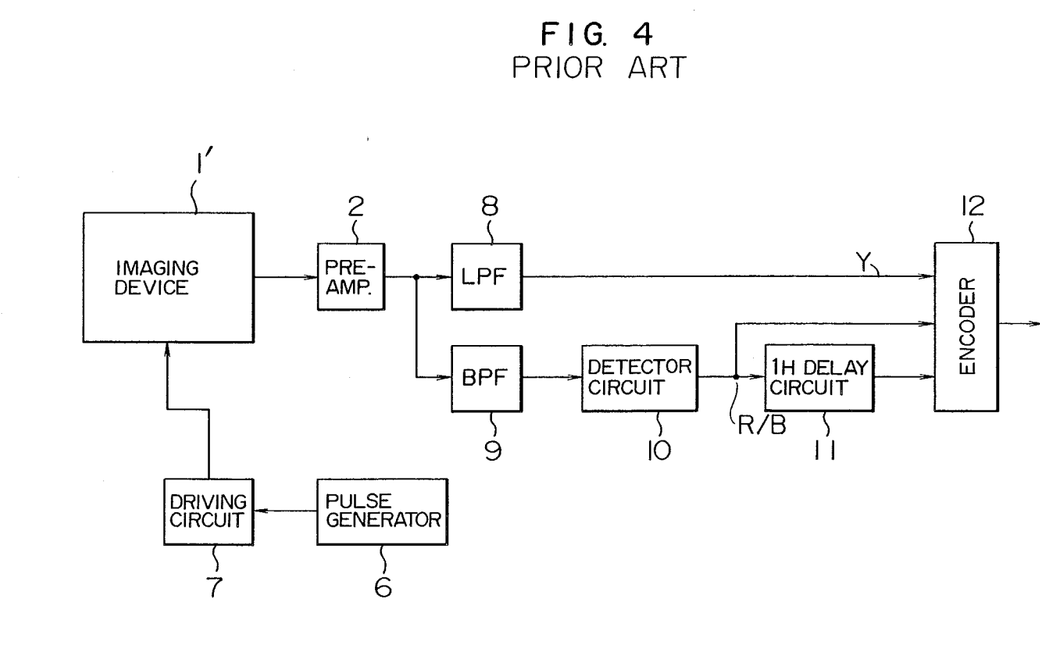
FIG. 4 shows an arrangement of a signal processing apparatus for use with a prior art single chip solid-state color camera.

Meanwhile an example of a single chip solid-state color camera employing a CCD imaging device is disclosed in, for example, No. JP-A-60-3290 (laid open on Jan. 9, 1985) wherein an imaging device 1' comprises such a color filter made up of elements arranged in a mosaic or matrix form as shown in FIG. 3 and an image signal from the imaging device 1' is processed by such a signal processing circuit as shown in FIG. 4.

The schematic operation of the prior art example is as follows.

That is, with the color filter of the matrix shown in FIG. 3, the color filter elements W (allowing passage of all the color light components therethrough), Cy (allowing passage of cyan light component therethrough), W and Ye (allowing passage of yellow color light component therethrough) are cyclically arranged in the first column $H_1$; and the color filter elements G (allowing passage of green color light component therethrough), Ye, G and Cy are cyclically arranged in the second column $H_2$.

Color filter elements, cyclically arranged as described above are provided for respective pixels or photodiodes in the imaging device. When pixel signal pieces are read for every two adjacent lines of the CCD imaging device provided with the color filter and mixed with each other (the so-called field storage mode interlace), the signal detector part or the output means of the imaging device delivers, for example, a mixture signal of W ($H_1$, $V_1$) and Cy ($H_1$, $V_2$) and a mixture signal of G ($H_2$, $V_1$) and Ye ($H_2$, $V_2$) sequentially in the first line scanning operation and a mixture signal of W ($H_1$, $V_3$) and Ye ($H_1$, $V_4$) and a mixture signal of G ($H_2$, $V_3$) and Cy ($H_2$, $V_4$) in the second scanning line operation of the first field.

Figure 5:
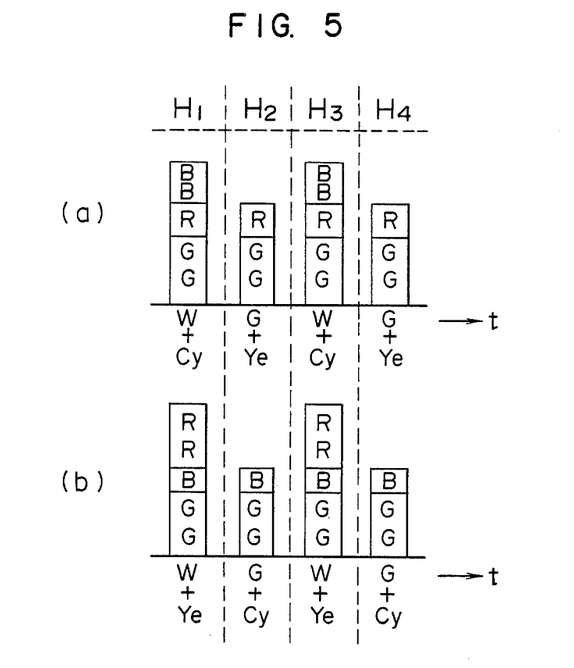
FIG. 5 shows exemplary signals obtained from a CCD imaging device in FIG. 4.

The output signals obtained through the first and second line scanning operations have such components as shown in FIGS. 5(a) and 5(b), respectively. More specifically, a frequency modulated chroma signal B appears in the output signal of the first scanning operation as, while a chroma signal R appears in the output signal of the second scanning operation.

In the second field where the combination of two lines to be mixed is shifted by one line from that in the first field, a mixture signal of Cy ($H_1$, $V_2$) and W ($H_1$, $V_3$) and a mixture signal of Ye ($H_2$, $V_2$) and G ($H_2$, $V_3$) are sequentially obtained in the first scanning operation, while a mixture signal of Ye ($H_1$, $V_4$) and W ($H_1$, $V_5$) and a mixture signal of Cy ($H_2$, $V_4$) and G ($H_2$, $V_5$) are sequentially obtained. Accordingly, the chroma signals B and R subjected to a frequency modulation similarly appear in the respective output signals.

In the prior art signal processing circuit of such an arrangement as shown in FIG. 4, an output signal of the CCD imaging device 1' is applied through the preamplifier 2 to a low pass filter 8 to obtain a luminance signal and also to a band pass filter 9.

The band pass filter 9 outputs alternately the frequency-modulated chroma signals B and R alone at intervals of one horizontal scanning period. The chroma signals B and R are applied to a detector circuit 10 to be demodulated to respective base band signals. The base band signals are supplied from the detector 10 to a 1H line delay circuit 11 so that the chroma signals B and R are simultaneously applied to an encoder circuit 12 together with the luminance signal sent from the low pass filter 8 to obtain a color video signal from the circuit 12. A pulse generator 6 and a driving circuit 7 may be similar ones in FIG. 1.

Figure 6:
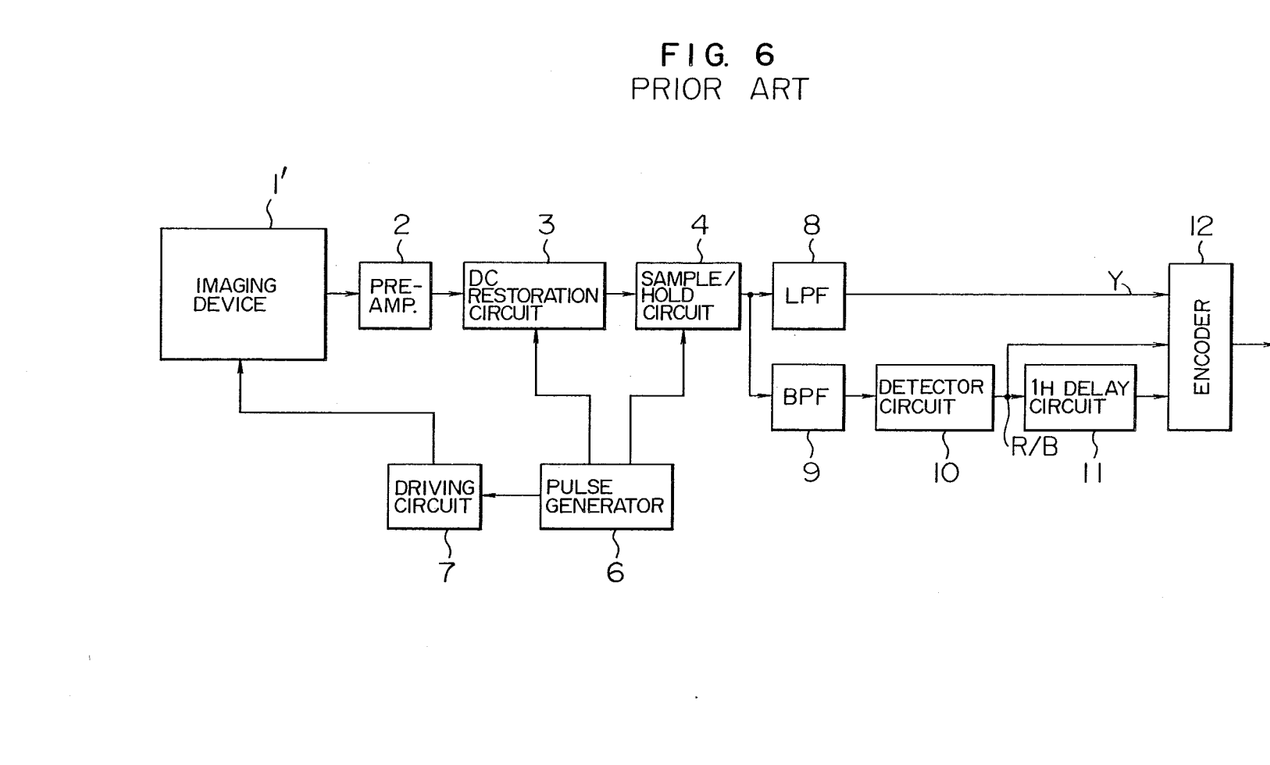
FIG. 6 shows an exemplary arrangement of a signal processing circuit for use with a single chip solid-state color camera, which utilizes a combination of the conventional techniques for noise suppression.

When the two prior art signal processing circuits of FIGS. 1 and 4 are combined together, there can be realized such a single chip solid-state color camera that uses a CCD imaging device and produces less noise. For example, refer to a paper entitled "Color Characteristics of ½-Inch PAL system CCD" reported by Ohmae et. al. in Preliminary Transactions for 1985 Nation-wide Congress of The Institute of Television Engineers of Japan, 1985, pp. 83–84. The combined circuit arrangement may be as shown in FIG. 6. That is, the combination circuit requires the DC restoration circuit 3 and the sample-hold circuit 4 for noise suppression and requires the band pass filter 9 and the detector circuit 10 for demodulation of the chroma signals in the course from generation of the output signal of the CCD imaging device 1' until demodulation of the chroma signals while suppressing reset noise. In this way, the combination circuit of FIG. 6 is increased in the circuit structure scale as compared with that of the prior art of FIG. 4 without noise reduction function.

Further, with respect to a color filter to be used in the single chip solid-state color camera, it is difficult for the respective color filter elements to pass 100% of their transmission lights (that is, the filters having respectively a transmittance of 100%) and it is also difficult to make equal peak values in the transmittance characteristics of the color filter elements allowing passage of their different transmission color light components.

For example, with the color filter shown in FIG. 3, if the filter elements W for passage of whole color light components have all a transmittance of 100% because they have no filtering action and the filter elements Cy, Ye and G have respectively a transmittance of 90%, then the following mixture or added signals can be obtained during each horizontal scanning interval.

$$W + Cy = 1.9G + 1.0R + 1.9B \quad (1)$$

$$Ye + G = 1.8G + 0.9R \quad (2)$$

$$W + Ye = 1.9G + 1.9R + 1.0B \quad (3)$$

$$Cy + G = 1.8G + 0.9B \quad (4)$$

The chroma signal B obtained by passing the modulated components (W+Cy) and (Ye+G) through the band pass filter corresponds to a difference between the equations (1) and (2). That is, the chroma signal B is expressed by the following equation (5).

$$B = 1.9 \left\{ B + \frac{0.1}{1.9} (G + R) \right\} \quad (5)$$

Since the chroma signal R obtained from the modulated components (W+Ye) and (Cy+G) corresponds to a difference between the equations (3) and (4), the signal R is expressed as follows.

$$R = 1.9 \left\{ R + \frac{0.1}{1.9} (G + B) \right\} \quad (6)$$

It will be seen from equations (5) and (6) that when the color filters have such transmittances as mentioned above, the chroma signals B and R obtained according to the conventional demodulation system contains color mixture components $$\frac{0.1}{1.9} (G + R) \text{ and } \frac{0.1}{1.9} (G + B),$$

respectively.

As has been explained in the foregoing, the single chip solid-state color camera using the conventional noise reduction method has such a problem that the camera is increased in the circuit structure scale when compared with the camera not having a noise reduction function, whereas the single chip solid-state color camera using the conventional color signal demodulation method has such a problem that no consideration is paid to variations in the peak values of the transmittance characteristics of the color filter elements and the demodulated chroma signal contains the color mixture component in this camera.

SUMMARY OF THE INVENTION

An object of the present invention is to provide a signal processing apparatus for use with an imaging device of a single chip solid-state color camera, capable of decreasing noise in a video signal to be generated from the camera without increasing the circuit structure scale.

Another object of the present invention is to provide a signal processing apparatus for use with an imaging device of a single chip solid-state color camera, capable of decreasing noise in an image signal to be generated from the camera without any substantial increase of the circuit structure scale and suppressing color mixture in demodulated chroma signal for forming a video signal to be generated from the camera.

An image signal to be obtained from an imaging device contains noise-superposed pixel signal pieces representative of at least two kinds of color components of an image and alternately recurrent one after another with a predetermined period. According to one aspect of the present invention, means is provided for disabling or nullifying noise at least during a part of each of the periods. The output of the disabling or nullifying means is supplied to the same number of sampling and holding means as that of the above-mentioned color component kinds to individually produce therein noise-suppressed pixel signals for demodulation of chroma signals corresponding to the above-mentioned color components. The luminance signal and the chroma signals of the video signal are obtained from a sum of and differences between the outputs of the holding and sampling means.

According to another aspect of the present invention, the amplitudes of the outputs of the sampling and holding means may be adjusted by respective gain control means and then a chroma signal is obtained from a difference between the two adjusted signals.

The noise reduction means has a function of separating an image signal from the imaging device into a plurality of (for example, two) pixel signals. Since demodulation of the modulated chroma signals is carried out by finding a difference signal between the separated pixel signals, the present invention can eliminate the need for such a detector circuit and a band pass filter as in the prior art, thus enabling the prevention of increase of the circuit structure scale. In addition, the plurality of separated pixel signals may be individually varied with respect to the amplitude, so that even when the color filter elements have different transmittances or their peak values, color mixture components generated in the demodulated chroma signal can be suppressed.

DESCRIPTION OF THE PREFERRED EMBODIMENTS

An embodiment of the present invention will be described with reference to FIG. 7.

Figure 7:
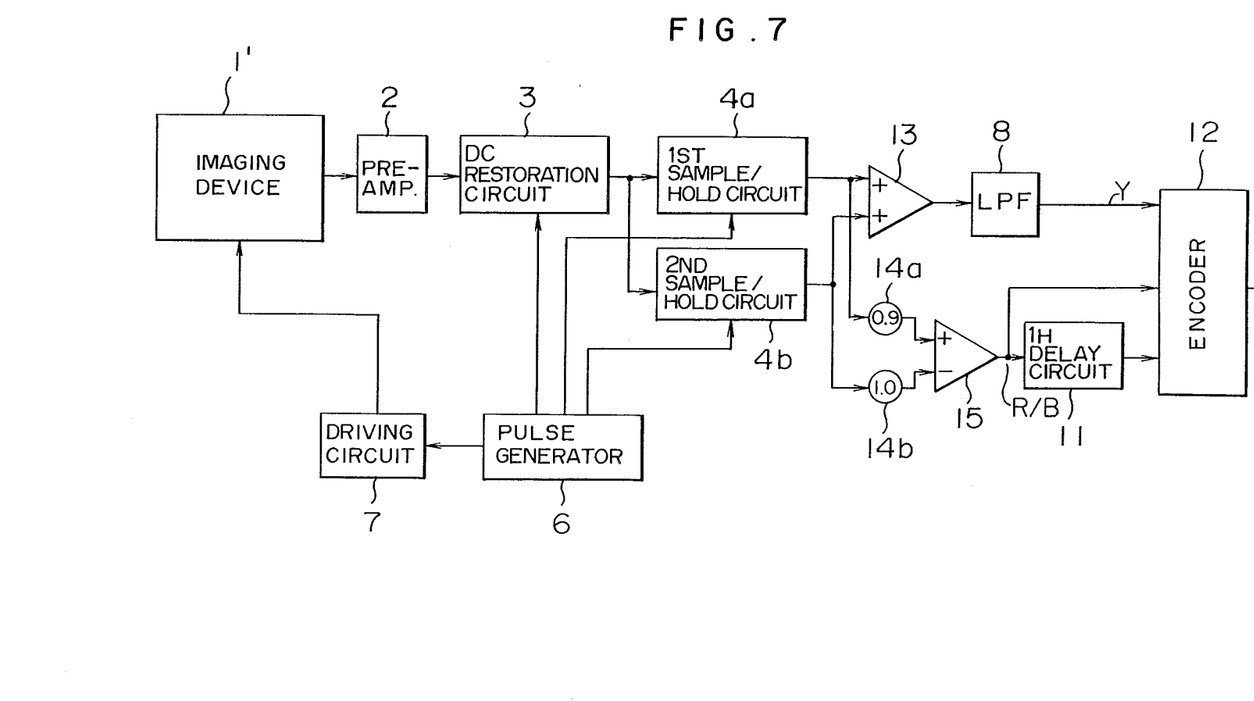
FIG. 7 shows an arrangement of a signal processing apparatus for use with a single chip solid-state color camera in accordance with an embodiment of the present invention.
Figure 8:
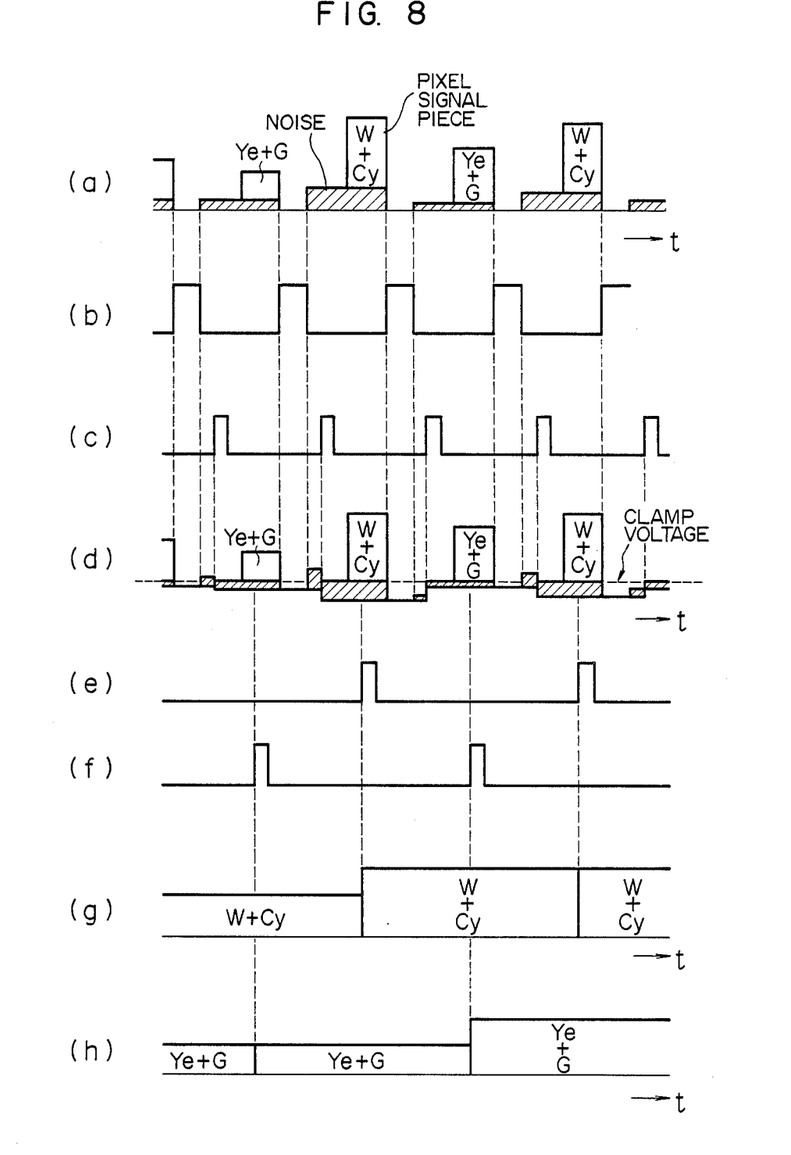
FIG. 8 shows waveforms of signals appearing various points in FIG. 7 for explanation of the operation of the embodiment of FIG. 7.

FIG. 7 shows an arrangement of a single chip solid-state color camera using a noise suppression method, wherein a CCD imaging device 1', which comprises a color filter as shown in FIG. 3 such as in the prior art and a signal detector part (output means) similar to that denoted by reference symbol 1S in FIG. 1. The imaging device 1', when receiving a driving pulse signal generated in a pulse generator 6 and shaped in a driving circuit 7, mixes and reads out pixel signals corresponding to two lines (the so-called field storage mode interlace). A pixel signal, which is obtained from the CCD imaging device 1' in response to a reset pulse signal $(b)$ and has such a waveform as shown in FIG. 8$(a)$, includes pixel signal pieces which are representative of at least two kinds of color components of an image and which are alternately recurrent one after another with a predetermined period, with noise being superposed on the pixel signal piece in each period of the image signal. The pixel signal $(a)$ is preamplified by a preamplifier 2 and then applied to a DC restoration circuit 3, in which DC level of the pixel signal $(a)$ where only reset noise appears is clamped by a clamp pulse signal as shown in FIG. 8$(c)$ to a constant potential to obtain a noise disabled or nullified pixel signal having a waveform as shown in FIG. 8$(d)$, as in the prior art.

Further, in the embodiment of the present invention, an output signal of the DC restoration circuit 3 is applied to sample-hold circuits 4a and 4b to be sampled by pulse signals (shown respectively in FIGS. 8$(e)$ and 8$(f)$) which are generated from the pulse generator 6 to be supplied to the respective circuits 4a and 4b and are mutually shifted by a phase corresponding to about one period, whereby such two sorts of noise-suppressed pixel signals with the reset noise removed as shown in FIGS. 8$(g)$ and 8$(h)$ can be separately obtained for demodulation of two chrominance signals corresponding to two color components of the image.

The two sorts of separated noise-suppressed pixel signals are added together by an adder 13 and then passed through a low pass filter 8 to form a luminance signal.

The two sorts of noise-suppressed pixel signals are also supplied through gain control circuits 14a and 14b to a subtracter 15 to find a difference between the two pixel signals, whereby a base band signal to which the frequency-modulated chroma signal B or R is converted can be obtained. In the absence of generation of substantial color mixture caused by unbalanced transmittances of the color filter elements, the gain control circuits 14a and 14b may be omitted.

When the thus obtained chroma signal in the form of the base band signal is supplied to a 1H delay circuit 11 so that the chroma signals ʙ and ʀ are simultaneously applied to the encoder circuit 12 together with the luminance signal sent from the low pass filter 8, to an encoder 12 to obtain a color video signal.

If the elements W in the color filter matrix have all a transmittance of 100% and the color filter elements Cy, G and Ye have respectively a transmittance of 90% for example, then the G, R and B component ratios in the noise-suppressed pixel signals are expressed by equations (1) to (4), as has been explained earlier. Therefore, when the gain control circuits 14a and 14b are set to have gains of 0.9 and 1.0 respectively, only the added signal (W+Cy) or (W+Ye) can be multiplied by 0.9.

As a result, the chroma signals ʙ and ʀ obtained from the subtracter 15 are written as follows.

$$\begin{aligned}
\text{ʙ} &= 0.9 \times (W + Cy) - (Ye + G) \\
&= 0.9 \times (1.9G + 1.0R + 1.9B) - (1.8G + 0.9R) \\
&= 0.9 \times 1.9 \times \left(B + \frac{0.1}{1.9} G\right)
\end{aligned} \quad (7)$$

-continued $$\begin{aligned} \mathbb{R} &= 0.9 \times (W + Ye) - (Cy + G) \quad (8) \\ &= 0.9 \times (1.9G + 1.9R + 1.0B) - (1.8G + 0.9B) \\ &= 0.9 \times 1.9 \times \left( R + \frac{0.1}{1.9} G \right) \end{aligned}$$

It will be seen from a comparison between equations (5) and (7) and between equations (6) and (8) that in accordance with the embodiment of the present invention, the color mixture component of the demodulated chroma signal generated due to different transmittances of the color filter components can be suppressed by an amount corresponding to the term R or B in the corresponding equation when compared with that in the prior art.

Figure 9:
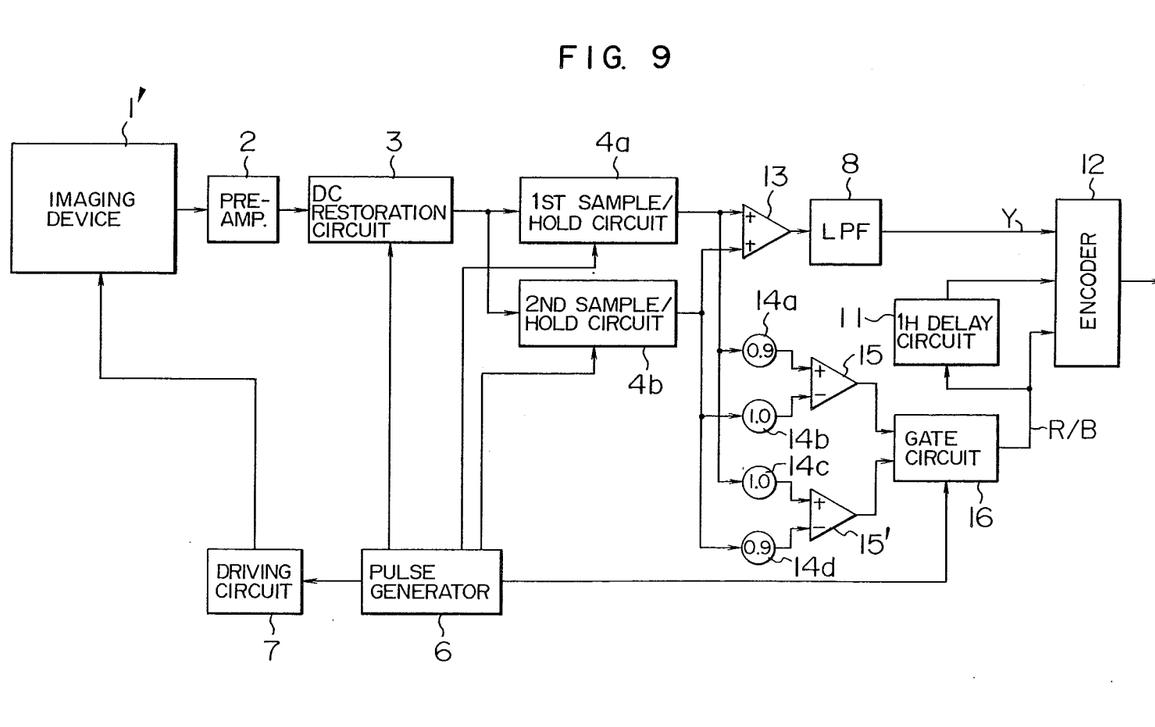
FIGS. 9 and 10 are arrangements of other embodiments of the present invention respectively.

Referring next to FIG. 9, there is shown another embodiment of the present invention. The foregoing explanation of the embodiment of FIG. 7 has been made in connection with the case where only the color filter elements W are different in transmittance from the other elements. However, in the present embodiment, the noise-suppressed pixel signal (W+Cy) or (W+Ye) for example is applied to the gain control circuit 14a in the first line scanning operation of the first field and is applied to the gain control circuit 14b in the second line scanning operation of the same field. Accordingly, in the case where the transmittance of filter elements Cy or Ye (and not filter element W) is different from that of the other ones, the gains of the respective gain control circuits must be switched at intervals of one scanning line for the purpose of suppressing the color mixture component of the chroma signal.

To this end, as shown in the embodiment of FIG. 9, gain control circuits 14c and 14d and a subtracter 15' are added, the gain control circuits 14a and 14b are set to have respectively optimum gains in the first scanning line and the gain control circuits 14c and 14d are set to have respectively optimum gains in the second scanning line (which optimum gain is 0.9 for the gain control circuits 14a and 14d and 1.0 for the gain control circuits 14b and 14c, when the color filter element Cy has a transmittance of 90%, for example), the outputs of the subtracters 15 and 15' are selected by a gate circuit 16, whereby even if the transmittance of only the filter elements Cy or filter elements Ye is different from that of the other ones, the color mixture component in the chroma signal can be suppressed.

Although noise reduction has been effected with the use of the DC restoration circuit and the sample-hold circuit in the foregoing description, such a noise reduction method as suggested in, for example, No. GB-A-2071959 laid open on Sept. 23, 1981 (corresponding to No. JP-A-56-116734) may also be utilized to obtain the similar effect. An example of the latter case is shown in FIG. 10.

Figure 10:
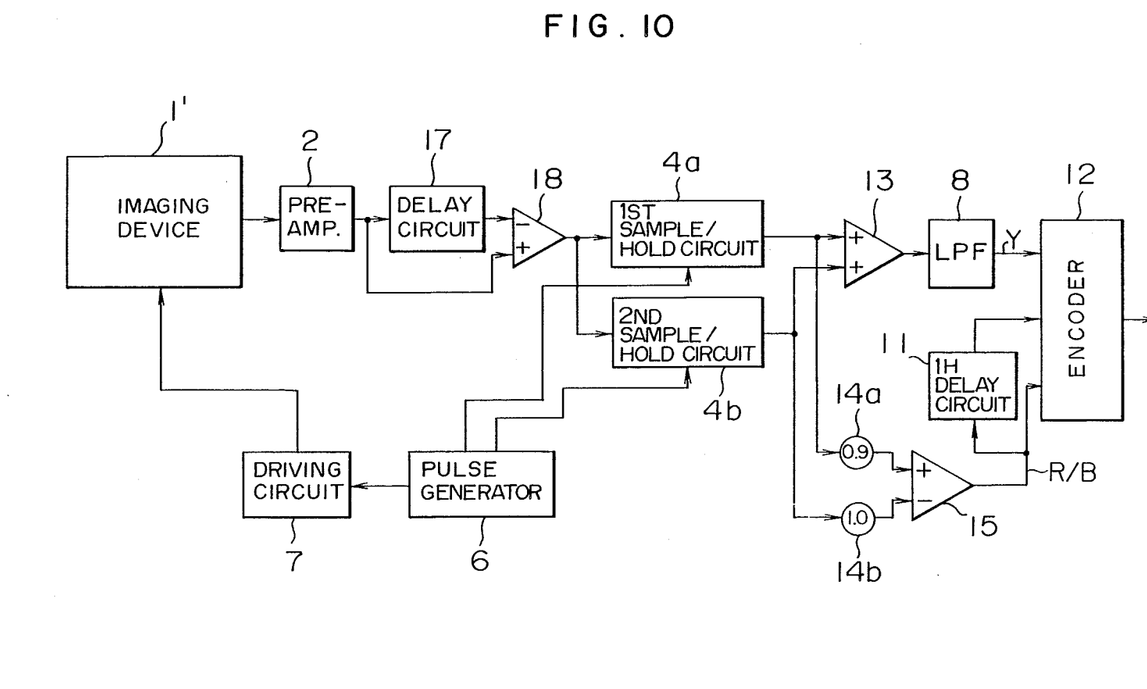

Referring to FIG. 10, there is shown another embodiment of the present invention, wherein an output signal of a CCD imaging device 1' is applied to a preamplifier 2 and then to a delay circuit 17 so that, at the same time when the preamplifier 2 outputs a pixel signal superposed with reset noise, the circuit 17 outputs a delayed reset noise part followed by the remaining part of the delayed signal. And, the outputs of the preamplifier 2 and the delay circuit 17 are applied to a subtracter 18 to generate a signal with the reset noise removed at least partly, and only the pixel signal information can be obtained by sampling the reset-noise removed signal part. In the present embodiment, since both the noise reduction and the separation of the noise-suppressed pixel signal are simultaneously achieved by means of sample-hold circuits 14a and 14b, a video signal from a single chip solid-state color camera can be noise-suppressed without increasing the circuit structure scale, as in the embodiment shown in FIG. 7.

Constituent circuits in the subsequent stages may be arranged in the same manner as those in the embodiment shown in FIG. 7 or 9, thereby also allowing the suppression of the color mixture component of the chroma signal caused by the different transmittances of the color filter elements.

Further, the foregoing explanation has been made in connection with the use of the color filter shown in FIG. 3, but other color filters may be used in the present invention so long as they cause the pixel signal obtained from a CCD imaging device to be frequency-modulated with the chroma signal.

Figure 11:
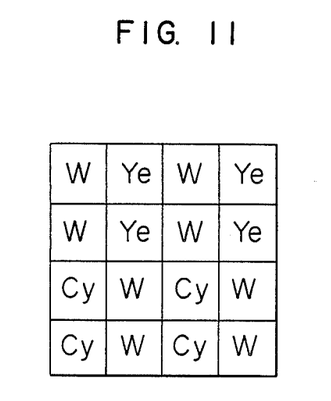
FIGS. 11 and 12 show other examples of the color filters which may be used with the present invention, respectively.

If frame storage mode interlace is effected with the use of a CCD imaging device combined with such a color filter as, for example, shown in FIG. 11, then the output signal contains the frequency-modulated chroma signals B and R alternately appearing at intervals of one scanning line and therefore a single chip solid-state color camera using the present invention can be realized.

Figure 12:
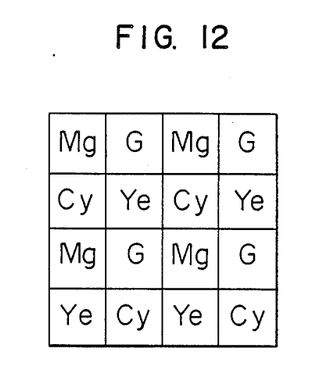

In addition, even when such a color filter shown in FIG. 12 that produces the frequency-modulated signals corresponding to color difference signals (R−G) and (B−G) is employed, a single chip solid-state color camera using the present invention can be realized.

We claim:

1. A signal processing apparatus for use with an imaging device having an image signal output means inherently generating noise in operation so that noise may be superposed on the image signal, said image signal from said output means including pixel signal pieces representative of at least two kinds of color components of an image alternately recurrent one after another with a predetermined period with said noise being superposed on the pixel signal piece in each period, the apparatus comprising:

means connected with said image signal output means for disabling the noise superposed on the pixel signal piece at least during a part of said each period;

means connected with said disabling means for sampling and holding an output of said disabling means, using at least two sampling pulses mutually phase-shifted by an amount substantially identical with said period, to extract a noise-disabled part of the output of said disabling means and, at the same time, to separate the extracted signal for generating at least two noise-suppressed pixel signals for demodulation of chroma signals corresponding to said at least two kinds of color components of an image during line periods of the image signal;

means connected with said sampling and holding means for producing a sum of said noise-suppressed pixel signals to generate a luminance signal; and means connected with said sampling and holding means for producing a difference between said noise-suppressed pixel signals to generate chroma signals each for every other line period.

2. An apparatus according to claim 1, further comprising gain control means interposed between said sampling and holding means and said difference producing means to substantially level the amplitudes of said noise-suppressed pixel signals.

3. An apparatus according to claim 2, in which said sampling and holding means includes first and second sampling and holding circuits connected with said disabling means for generating first and second noise-suppressed pixel signals.

4. An apparatus according to claim 3, in which said difference producing means includes a subtracter for receiving said first and second noise-suppressed pixel signals through said gain control means to generate chroma signals each for every other line period.

5. An apparatus according to claim 3, in which said difference producing means includes first and second subtracters for receiving said first and second noise-suppressed pixel signals through said gain control means, and outputs of said first and second subtracters are connected to a gate circuit so that each of said outputs of said first and second subtracters is delivered as a chroma signal for every other line period.

6. An apparatus according to claim 1, in which said disabling means includes a DC restoration circuit for clamping said image signal with said noise superposed thereon to a predetermined DC level thereby producing the output of said disabling means to be supplied to said sampling and holding means.

7. An apparatus according to claim 6, further comprising gain control means interposed between said sampling and holding means and said difference producing means to substantially level the amplitudes of said noise-suppressed pixel signals.

8. An apparatus according to claim 7, in which said sampling and holding means includes first and second sampling and holding circuits connected with said DC restoration circuit for generating first and second noise-suppressed pixel signals, and said difference producing means includes a subtracter for receiving said first and second noise-suppressed pixel signals through said gain control means to generate chroma signals each for every other line period.

9. An apparatus according to claim 1, in which said disabling means includes a delay circuit for delaying said image signal and a subtracting circuit for receiving a portion of said image signal and an output of said delay circuit for producing a difference therebetween as the output of said disabling means to be supplied to said sampling and holding means.

10. An apparatus according to claim 9, further comprising gain control means interposed between said sampling and holding means and said difference producing means to substantially level the amplitudes of said noise-suppressed pixel signals.

11. An apparatus according to claim 10, in which said sampling and holding means includes first and second sampling and holding circuits connected with said subtracting circuit for generating first and second noise-suppressed pixel signals, and said difference producing means includes a subtracter for receiving said first and second noise-suppressed pixel signals through said gain control means to generate chroma signals each for every other line period.

* * * * *